United States Patent Office 3,108,262
Patented Oct. 22, 1963

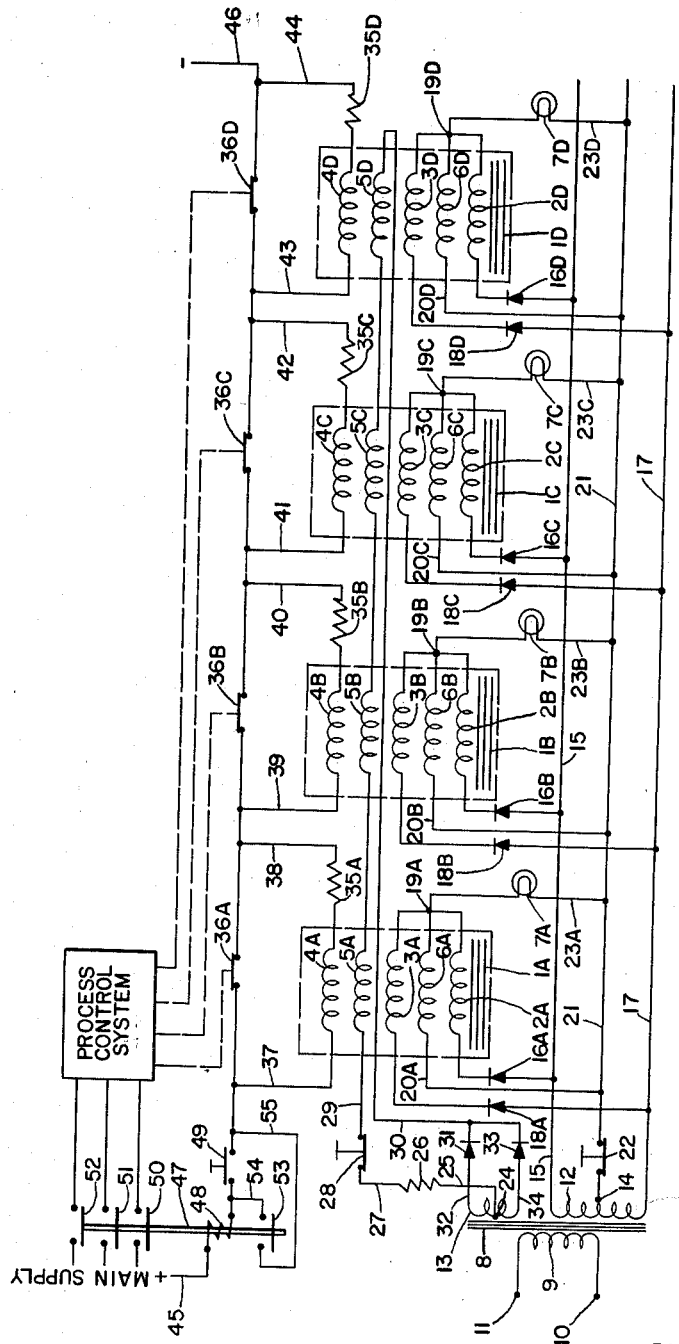

3,108,262
FAULT INDICATING SYSTEM
Richard T. Saba, Cleveland, Ohio, assignor to The Clark Controller Company, Cleveland, Ohio, a corporation of Ohio
Filed Jan. 5, 1960, Ser. No. 557
9 Claims. (Cl. 340—213)

This invention relates to an indicating system and more particularly for causing a visible indication to be made upon the opening of an electric contact in an electrical circuit and for specifically indicating the location of said contact.

Indicating systems of this type are capable of being utilized to great advantage in complex control systems where it is desirous to monitor the occurrence of certain events. Some of these uses are to indicate the occurrence of a fault, the movement of a piece of material through a process, the feeding of a rod into a machine tool, the sequential or cyclic operation of a machine, and many others.

In order to fully describe my invention in one of its practical applications, as is required by law, I have chosen to describe its operation as a fault indicating system.

In this particular use, the indicating system not only indicates that a fault has occurred in the electrical circuit being monitored, but also indicates at what point in the circuit the fault has occurred.

Fault indicating systems of this type are utilized to great advantage in the complex electrical control circuits for the controlling of processes. In these circuits, many different protective devices are used. The individual protective devices are used to protect the process itself, the drive motors, and some of the control components. In most instances, the protective devices are connected to be operated upon the occurrence of a dangerous condition and shut down the entire system. This is done by having an electrical contact of the protective device connected in the undervoltage circuit. The undervoltage circuit controls an electromagnetic device which, in turn, connects and disconnects the electrical power from the process control system.

When one of the protective devices operates, it opens one of its contacts which de-energizes the undervoltage circuit and causes the electromagnetic device to disconnect the power from the process control system.

Because of the complexity of such systems, it is a very tedious and time consuming job for maintenance men to locate the source of trouble without a fault indicating system.

The fault indicating system is connected to indicate which protective device has operated and thereby pinpoint the source of trouble for the maintenance man. Then, he need only find the cause of the trouble and correct it. Thus, the time consuming search for the source of trouble is eliminated.

Heretofore, systems of this type have been made utilizing movable indicating flags which become visible to indicate that a fault has occurred. These flags are operated by an electromagnetic device which receives a pulse signal from the circuit being protected. Still other systems of this type have been developed utilizing electronic tubes. The tubes are connected in circuits which cause them to become conductive upon the occurrence of a fault. In some circuits, the glow of the tube itself is used to indicate the occurrence of a fault. In others, the current conducted by the tube is used to illuminate a lamp. These systems have proved to be unreliable due to the movement of parts and the unstable characteristics inherent in an electronic circuit.

The fault indicating system of the present invention utilizes a memory type magnetic circuit. The magnetic circuit is comprised of a magnetic amplifier having a core with a pair of power windings, a feedback winding, a bias winding, and a control winding wound on the core.

An indicating lamp is connected in series with the power windings and in parallel with the feedback winding.

In the normal condition, the lamp is extinguished because the core is maintained unsaturated by current flowing through the bias winding. As is well known, the power windings will conduct only a small value of current when the core is unsaturated and even though some of this current does flow through the indicating lamp, it is insufficient to illuminate the lamp.

A plurality of these magnetic amplifiers may be interconnected to make a fault indicating unit so the entire process control system can be monitored from one location.

Each control winding is connected in parallel with a contact of a different protective device. These contacts of the protective devices are conected in series in the undervoltage circuit. Upon the occurrence of an unsafe condition, such as a motor overload, the associated protective device, in this case an overload relay, will operate to open its contact. This impresses a voltage across the parallel connected control winding and current flows through it in a direction to saturate its core. Even though current flows through the control winding, the impedance of its circuit is made so high that insufficient current will flow in the undervoltage circuit to maintain the undervoltage relay energized. When the undervoltage relay becomes de-energized, it opens its contacts to shut off power to the process.

With the core of the magnetic amplifier saturated, high current flows through the power windings and through the lamp to illuminate it, thereby giving the visual indication that a fault has occurred. Also, by properly noting which magnetic amplifier is connected to which protective device, the illumniation of a lamp will indicate which protective device has operated and thus, where the fault has occurred.

Since the lamp and the feedback winding is connected in parallel, some of the high current flowing through the power windings also flows through the feedback winding. This flow of current through the feedback winding is in a direction to maintain the core saturated.

Therefore, once the core is saturated, even if by a pulse of current through the control winding, the core is maintained saturated by current flowing through the feedback winding and the lamp is maintained illuminated.

The lamp will remain illuminated even after the fault has been corrected and can only be extinguished by a resetting switch. This switch disconnects power from the power windings so no current flows through them. Thus, no current can flow through the lamp and it becomes extinguished. Also, no current is available to flow through the feedback windings. This eliminates the self-saturating action of the feedback winding and the current flowing through the bias winding causes the core to become unsaturated.

The power for the fault indicating system is furnished by means of a transformer and the control signal to the fault indicating system is provided by current flowing through a winding on the core making the fault indicating system electrically isolated from the process control system.

The cores of the magnetic amplifiers are made of material so that should power be removed from the fault indicating system and then later restored, the cores will remain in the same state of saturation as they were prior to the removal of the power. That is, if the system is indicating a particular fault when the power is removed, the reapplication of power to the system will cause the same indicating lamp to be illuminated again as it was prior to the removal of the power.

Also, the indicating system will indicate transitory faults that occur only momentarily and which are not of sufficient duration to de-energize the undervoltage relay. This again is important to the maintenance man because it gives him an indication of a possible trouble and thus, allows him the opportunity of providing preventive maintenance.

Test means are provided whereby the power circuit to the bias winding is opened, allowing the magnetic amplifier's core to saturate due to current flowing in the power windings. This causes all of the lamps to be illuminated and gives a check as to the proper operation of the circuit and its components.

It is therefore the primary object of my invention to provide an indicating system that has all of the above mentioned features.

It is also another object of my invention to provide an indicating system that has no moving parts and is stable in its operation.

It is a further object of my invention to provide an indicating system that is inexpensive to manufacture and which is readily installed to existing systems.

The single figured drawing shows, diagrammatically, four magnetic amplifiers connected to form a fault indicating system and having cores 1A, 1B, 1C and 1D, respectively.

On core 1A is wound power windings 2A and 3A, a control winding 4A, a bias winding 5A and a feedback winding 6A. An indicating lamp 7A is connected in parallel with feedback winding 6A.

Core 1B has power windings 2B and 3B, a control winding 4B, a bias winding 5B and a feedback winding 6B wound thereon. An indicating lamp 7B is connected in parallel with feedback winding 6B.

Core 1C has power windings 2C and 3C, a control winding 4C, a bias winding 5C and a feedback winding 6C wound thereon. An indicating lamp 7C is connected in parallel with feedback winding 6C.

Core 1D has power windings 2D and 3D, a control winding 4D, a bias winding 5D and a feedback winding 6D wound thereon. An indicating lamp 7D is connected in parallel with feedback winding 6D.

The fault indicating system receives its power from a transformer 8 having a primary winding 9 connected to a suitable A.C. source by wires 10 and 11. Transformer 8 has two secondaries 12 and 13.

Secondary 12 has a center tap 14 thereon and one side of it is connected by a wire 15 and a rectifier 16A to power winding 2A. Likewise, power windings 2B, 2C and 2D of the other magnetic amplifiers are connected by rectifiers 16B, 16C and 16D, respectively, to wire 15.

The other side of secondary 12 is connected by a wire 17 and a rectifier 18A to power winding 3A. Likewise, power windings 3B, 3C and 3D are connected to wire 17 by rectifiers 18B, 18C and 18D, respectively.

The other ends of power windings 2A and 3A, 2B and 3B, 2C and 3C, 2D and 3D, are connected together at points 19A, 19B, 19C and 19D, respectively.

One side of feedback windings 6A, 6B, 6C and 6D are connected respectively to points 19A, 19B, 19C and 19D and have their other ends connected by wires 20A, 20B, 20C and 20D, respectively, to a wire 21.

A normally closed push button switch 22 connects wire 21 to center tap 14.

Lamps 7A, 7B, 7C and 7D are connected, respectively, between points 19A, 19B, 19C and 19D and wire 21 by wires 23A, 23B, 23C and 23D, respectively.

Bias windings 5A, 5B, 5C and 5D are connected in series.

They are connected to be supplied from secondary 13 so in one half of the cycle current flows from one side of secondary 13 by wire 32, rectifier 31, wire 30, the series connected bias windings, wire 29, normally closed push button switch 28, wire 27, resistor 26, and wire 25 to a center tap 24 on secondary 13.

In the other half of the cycle, current flows from the other side of secondary 13 by wire 34, through rectifier 33, wire 30, the series connected bias windings, wire 29, normally closed push button switch 28, wire 27, resistor 26 and wire 25 to center tap 24.

Control winding 4A and a resistor 35A are connected in series with each other and they are connected in parallel with a normally closed contact 36A by wires 37 and 38.

Control winding 4B and a resistor 35B are connected in series with each other and they are connected in parallel with a normally closed contact 36B by wires 39 and 40.

Control winding 4C and a resistor 35C are connected in series with each other and they are connected in parallel with a normally closed contact 36C by wires 41 and 42.

Control winding 4D and a resistor 35D are connected in series with each other and they are connected in parallel with a normally closed contact 36D by wires 43 and 44.

The normally closed contacts 36A, 36B, 36C and 36D are contacts of various types of protective devices that operate upon the occurrence of a fault or a dangerous condition in the process itself or in its control system. In the normal condition, these protective devices are unoperated and their contacts closed. However, upon the occurrence of a fault or unsafe condition, the associated protective device will operate in response thereto and open its contact.

Contacts 36A, 36B, 36C and 36D are connected in series with each other and a winding 48 of an undervoltage relay 47 through a normally open push button switch 49. The aforedescribed circuit forms the undervoltage circuit and it is connected to a source of direct current by wires 45 and 46.

The undervoltage relay 47 has main contacts 50, 51 and 52 which connect and disconnect a main source of power to the process control system. It also has a normally open auxiliary contact 53 which is connected in parallel with push button switch 49 by wires 54 and 55 to act as a holding contact for undervoltage relay 47.

In order to start the process, the operator must first depress push button switch 49 and current will flow from wire 45 through winding 48, the depressed push button switch 49, and through the closed contacts 36A, 36B, 36C and 36D to wire 46. With its winding 48 energized, undervoltage relay 47 operates to close its main contacts 50, 51 and 52 and its auxiliary contact 53. Push button switch 49 may then be released and the current flowing through wire 54, the now closed auxiliary contact 53 and wire 54 will maintain undervoltage relay 47 energized.

It is seen from the foregoing that the individual magnetic amplifier units of the fault indicating system are identically connected. Therefore, the operation of one magnetic amplifier will be described, it being understood that the same manner of operation applies to all.

In its normal state, the core 1A is unsaturated and lamp 7A is extinguished. Core 1A remains in this state until the fault which is to be indicated occurs.

Bias winding 5A is wound on core 1A so current flowing through it, as previously described, creates a flux in core 1A to maintain it in an unsaturated state and which opposes the flow of current through power windings 2A and 3A, and feedback winding 6A.

At the same time, current attempts to flow from secondary 12, through power windings 2A and 3A. This path in one half of the cycle is from wire 15, rectifier 16A, power winding 2A to point 19A, and thence by feedback winding 6A and wire 20A to wire 21. From point 19A, current also flows through the parallel path through lamp 7A and wire 23A to wire 21. From wire 21, the current flows through the normally closed push button switch 22 to center tap 14.

In the other half of the cycle, current attempts to flow from the other side of secondary 12 by wire 17, through rectifier 18A, power winding 3A to point 19A. From point 19, current flows through feedback winding 6A and wire 20A to wire 21 and also through the parallel path formed by lamp 7A and wire 23A to wire 21, and thence through the normally closed push button switch 22 to center tap 14.

Because of core 1A being unsaturated by a current flowing through the bias winding, only a small value of current will flow through the aforedescribed power windings 2A and 3A, feedback winding 6A and lamp 7A. Even though this small amount of current does flow through lamp 7A, it is of a value insufficient to illuminate the lamp.

For the purposes of the present discussion, assume that a fault occurs causing the protective device having contact 36A to operate. This causes contact 36A to open and a voltage is impressed across control winding 4A and resistor 35A. Current now flows by wire 37 through control winding 4A and resistor 35A, and back to the undervoltage circuit by wire 38.

As described before, the combined impedance of control winding 5A and resistor 35A is of a high value and only a small amount of current will now flow through the undervoltage circuit. This small value of current is insufficient to maintain winding 48 of undervoltage relay 47 energized. It becomes unoperated and opens its contacts 50, 51 and 52 to disconnect the power from the process control system. Contact 53 also opens to open the undervoltage circuit and prevent any further current flow through it.

It is now seen that the protective device has operated properly and caused the power to be disconnected from the process control system. The following description now describes how the operation of the protective device is indicated by the indicating system.

As before stated, the operation of the protective device opened contact 36A which caused current to flow through control winding 4A and resistor 35A. Even though only a small value of current flowed through control winding 4A, it was sufficient to create enough flux in core 1A to drive it to a saturated state. Once saturation of the core is reached, high values of current flow in alternate half cycles, as aforedescribed, through power windings 2A and 3A to point 19A. Here the current divides and some of it flows through feedback winding 6A and by wire 20A to wire 21, through normally closed push button switch 22 and thence to center tap 14. The flow of current through feedback winding 6A is in the direction to maintain core 1A saturated and thus, core 1A is maintained saturated after the current flowing through control winding 4A is stopped.

From point 19A, the remainder of the current flows through lamp 7A and thence by wire 23A to wire 21. Because of the large value of current flowing through power windings 2A and 3A, the amount of current flowing through lamp 7A is sufficient to cause it to be illuminated. Thereby, the indication is given that a fault has occurred at the point in the process control system where the protective device having contact 36A is located.

Maintenance men can then go to that point and determine what had created the fault, correct it and put the process back into operation.

It is to be noted that even after the fault has been corrected, lamp 7A will remain illuminated until the fault indicating circuit is manually reset.

To reset the fault indicating system and extinguish lamp 7A, it is necessary to depress push button switch 22. This opens its contacts and removes power from power windings 2A and 3A, feedback winding 6A and lamp 7A.

In addition to extinguishing lamp 7A, it also allows bias winding 5A to drive core 1A back to its unsaturated state. When push button switch 22 is released, core 1A remains in its normal or unsaturated state and very little current will flow through the power windings 2A and 3A and thus, lamp 7A remains extinguished.

The fault must be corrected and contact 36A of the protective device closed, otherwise lamp 7A will become illuminated again when push button switch 49 is depressed in an attempt to restart the process. This is because of the same aforedescribed operation which takes place after current has flowed through control winding 4A.

Also, another feature of the protective device is that it remembers the condition that it was in prior to power being removed from the entire fault indicating system. That is, should lamp 7A be illuminated and line 10 disconnected from the A.C. source, lamp 7A would be extinguished. Line 10 also disconnects the power to the bias winding 5A so it cannot drive core 1A to its unsaturated state. Therefore, core 1A remains saturated and when line 10 is again connected to the A.C. source, current will immediately flow through the power windings 2A and 3A, through feedback winding 6A to maintain core 1A saturated, and through lamp 7A to illuminate it again.

Another feature of the fault indicating system is that it need not be connected to its source of A.C. current when the process is initially started. Should a fault occur any time prior to its being connected, this fault will be indicated by the indicating system when it is connected to its source of power. The opening of one of the protective device contacts in the undervoltage circuit causes current to flow through the parallel connected control winding to saturate its associated core. This core will remain saturated and when power is connected to its power and bias windings, a high value of current will flow through the power windings and through the feedback winding to maintain the core saturated and also through the indicating lamp to illuminate it and give the proper indication of the fault.

The system is also responsive to transitory faults because of the self-saturating feature. That is, should the protective device operate only momentarily to open its contact for only an instant and then reclose before winding 48 of the undervoltage relay becomes de-energized, the current flowing through control winding 4A for only that instant will be sufficient to drive core 1A into saturation. As before described, once core 1A has been driven into saturation, high current will flow through power windings 2A and 3A. Core 1A will remain saturated due to the current flowing through feedback winding 6A to maintain core 1A saturated and through lamp 7A to illuminate it.

While I have described this particular embodiment of my invention in particular detail as to its operation upon the occurrence of a single fault, it is obvious that the fault indicating system would indicate two or more faults should they occur before the undervoltage circuit became de-energized.

In some applications, it is desirous to maintain the undervoltage circuit energized at all times. This can be accomplished in FIGURE 1 by omitting contact 53 from the circuit and changing push button switch 49 to a type that will hold itself closed, once depressed. In systems of this type, the fault indicating system will indicate all of the faults, regardless when they occur.

Also, the described embodiment illustrates four magnetic amplifiers connected to form one indicating system, but it is understood that any number of magnetic amplifiers can be connected together in a single system. A practical limitation to the number exists in the voltage across the undervoltage circuit.

The lamps have been shown in FIG. 2 as connected in parallel with the feedback winding, but it is obvious that they could be connected in series therewith without affecting the operation. However, when connected in parallel, they may be removed for testing without disturbing the saturation state of the core.

Although I have described my invention with a certain degree of particularity, it is understood that the above disclosure has been made only by way of example, as is required by law, and that many changes in the arrangement of the circuit may be resorted to without departing from the spirit and scope of my invention as hereinafter claimed.

I claim as my invention:

1. An indicating system comprising a contact whose position is to be indicated; a magnetic amplifier having a core with power windings, a feedback winding, a bias winding, and a control winding wound thereon; an indicating lamp; a source of alternating current; a rectifier for each power winding; each power winding and its corresponding rectifier connected to the source of alternating current for providing halfwave currents to the power windings; a common point of said halfwave current circuit; means connecting the feedback winding and said indicator lamp between said common point and said source of alternating current to provide a fullwave current network path to said source of alternating current; the bias winding connected to a direct current source of current to be energized by current flowing in a direction to normally maintain the core unsaturated; means connecting the control winding and said contact in parallel with each other and in series with a second direct current source of current so that when said contact is in its indicated position current flows from the second direct current source through the control winding in a direction to saturate the core allowing current sufficient to maintain the core saturated to flow from the source of alternating current through the power and feedback windings to maintain the core saturated providing current sufficient to illuminate said lamp.

2. An indicating system comprising a contact whose position is to be indicated; a magnetic amplifier having a core with power windings, a feedback winding, a bias winding and a control winding wound thereon; an indicating lamp; a source of alternating current; a rectifier for each power winding; each power winding and its corresponding rectifier connected to the source of alternating current for providing halfwave currents to the power windings; a common point of said halfwave current circuits; means connecting the feedback winding and said indicator lamp between said common point and said source of alternating current to provide a fullwave current return path to said source of alternating current; the bias winding connected to a direct current source of current to be energized by current flowing in a direction to normally maintain the core unsaturated; means connecting the control winding and said contact in parallel with each other and in series with a second source of current so that upon operation of said contact current flows from the second source of current through the control winding in a direction to saturate the core for allowing current from the source of alternating current to illuminate said lamp.

3. An indicating system comprising a first supply circuit, a plurality of normally closed contacts connected in said first supply circuit and in series with each other for current flow therethrough; a magnetic amplifier for each one of said plurality of normally closed contacts having a core with power windings, a feedback winding, a bias winding, and a control winding wound thereon; a source of alternating current; a rectifier for each power winding; each power winding and its rectifier connected to said source of alternating current for providing a halfwave current circuit in each power winding; each feedback winding connected between a common point of said halfwave current circuits and said source of alternating current for providing a fullwave current path; the bias winding connected to a direct current source of current to be energized by current flowing in a direction to normally maintain the core unsaturated; an indicating lamp connected in parallel with each feedback winding; each control winding connected in parallel with one of said plurality of normally closed contacts so that upon opening of said one of normally closed contacts, current flows through the control winding in a direction to saturate the core for allowing current from the source of alternating current to maintain the core saturated so that current flows through said lamp to brightly illuminate said lamp.

4. An indicating system as described in claim 3 wherein a normally closed switch is connected in said fullwave current circuit and so that actuation thereof will disconnect said supply circuit from the power windings, the feedback winding and the lamp; thereby allowing the current flowing through the bias winding to drive the core to its unsaturated state after the reclosing of said one of said plurality of normally closed contacts, and upon reclosing said switch only a small current will flow from the source of alternating current through said lamp.

5. An indicating system comprising a first supply circuit, a plurality of normally closed contacts connected in said first supply circuit and in series with each other for current flow therethrough; a plurality of magnetic amplifiers each having a core with power windings, a feedback winding, a bias winding, and a control winding wound thereon; a source of alternating current; a rectifier for each power winding; each power winding and its rectifier connected to said source of alternating current for providing a halfwave current circuit in each power winding; said feedback winding connected between a common point of said halfwave current circuits and said source of alternating current for providing a fullwave current circuit; the bias windings of all the magnetic amplifiers connected to a direct current supply circuit in series with each other and energized by current flowing in a direction to normally maintain the respective cores unsaturated; a plurality of indicating lamps, one lamp connected in parallel with each feedback winding; the control winding for each magnetic amplifier connected in parallel with a different one of the normally closed contacts; whereupon the opening of one of the normally closed contacts, current flows from the first supply circuit through the remaining closed contacts and through the control winding connected in parallel with the open contact in a direction to saturate its core allowing current sufficient to maintain said core saturated to flow from the source of alternating current to illuminate said lamp.

6. An indicating system comprising a first supply circuit, a plurality of normally closed contacts connected in said firt supply circuit and in series with each other for current flow therethrough; a plurality of magnetic amplifiers each having a core with power windings, a bias winding, and a control winding wound thereon; a source of alternating current; a rectifier for each power winding; each power winding and its rectifier connected to said source of alternating current for providing a halfwave current circuit in each power winding; an indicating lamp connected between a common point to said halfwave current circuits and said source of alternating current for providing a full wave current circuit therethrough; a direct current supply circuit; the bias winding of each magnetic amplifier connected in series with each other and energized by current flowing from said direct current supply circuit in a direction to normally maintain the respective cores unsaturated; the control winding for each magnetic amplifier connected in parallel with a different one of the normally closed contacts; whereupon the opening of one of the normally closed contacts, current flows from the first supply circuit through the remaining closed contacts and through the control winding connected in parallel with the open contact in a direction to saturate its core for allowing current from said source of alternating current to illuminate said lamp.

7. A fault indicating system comprising an electromagnetic device having an operating winding, a first supply circuit for said operating winding; a plurality of normally closed protective contacts connected in said first supply circuit and in series with each other and the operating winding for current flow therethrough; a plurality of magnetic amplifiers each having a core with power windings, a feedback winding, a bias winding, and a control winding wound thereon; a source of alternating current; a rectifier for each power winding; each power winding and its rectifier connected to said source of alternating current for providing a halfwave current circuit in each power winding; said feedback winding connected between a common point of said halfwave current circuits and said source of alternating current for providing a fullwave current circuit; the bias winding connected to a direct current supply circuit to be energized by current flowing in a direction to normally maintain the core unsaturated; an indicating lamp connected in parallel with each feedback winding; each control winding connected in series with a resistor and both connected in parallel with separate ones of the plurality of normally closed protective contacts; whereupon the opening of one of the said plurality of normally closed protective contacts, current flows from the first supply circuit through the operating winding, the remaining closed protective contacts, and the resistor and control winding connected in parallel with the open protective contact in a direction to saturate its core allowing current sufficient to maintain said core saturated to flow from the source of alternating current to illuminate said one of the lamps connected in parallel with the feedback winding so that the combined impedance of said control winding and resistor is of a high value to prohibit any substantial flow of current therethrough to maintain the operating winding of said electromagnetic device energized.

8. A fault indicating system comprising an electromagnetic device having an operating winding, a first supply circuit for said operating winding, a plurality of normally closed protective contacts connected in said first supply circuit and in series with each other and the operating winding for current flow therethrough; a plurality of magnetic amplifier each having a core with power windings, a feedback winding, a bias winding, and a control winding wound thereon; a transformer having a primary connected to a source of alternating current, said transformer having a first and second secondary; a source of alternating current; a rectifier for each power winding; each power winding and its rectifier connected to said source of alternating current for providing a halfwave current circuit in each power winding; said feedback winding connected between a common point of said halfwave current circuits and said source of alternating current for providing a full wave current circuit; means connecting the bias winding of all the magnetic amplifiers in series with each other and through rectifying means with the second secondary through a second normally closed switch, said bias winding energized by current flowing from the second secondary in a direction to normally maintain each core unsaturated; an indicating lamp for each magnetic amplifier connected in parallel with its feedback winding; the control winding of each magnetic amplifier connected in series with a resistor and both connected in parallel with a different one of the protective contacts; whereupon the opening of any one of the protective contacts, current flows through the control winding and resistor connected in parallel with said protective contact in a direction to saturate its core for allowing current to illuminate said lamp, and the impedance of the control winding and the resistor is of a value to prevent current from flowing therethrough to maintain the operating winding of said electromagnetic device energized.

9. An indicating system comprising a first supply circuit, a normally closed contact connected in said first supply circuit for current flow therethrough, a magnetic amplifier having a core with power windings, a feedback winding, a bias winding, and a control winding wound thereon; a source of alternating current; a rectifier for each power winding; each power winding and its rectifier connected to said source of alternating current for providing a halfwave current circuit in each power winding; said feedback winding connected to a common point to said halfwave current circuits and said source of alternating current for providing a fullwave current circuit; a second supply circuit; means connecting the bias winding in series with normally closed contacts of a switch said bias winding energized by current flowing from the second supply circuit to normally maintain the core unsaturated; an indicating lamp connected in parallel with the feedback winding; the control winding connected in parallel with one of said plurality of normally closed contacts; whereupon depression of said switch to open its normally closed contacts, the current normally flowing through the bias winding is interrupted allowing the current to flow through the power windings and feedback winding to saturate the core and maintain the core saturated so that current flows through the lamp to illuminate said lamp.

References Cited in the file of this patent
UNITED STATES PATENTS

| | | |
|---|---|---|
| 2,647,232 | Ransom et al. | July 28, 1953 |
| 2,719,288 | Young | Sept. 27, 1955 |
| 2,730,574 | Belsey | Jan. 10, 1956 |
| 2,736,009 | Barnickel | Feb. 21, 1956 |
| 2,807,006 | Collins et al. | Sept. 17, 1957 |
| 2,849,544 | Herz et al. | Aug. 26, 1958 |
| 2,900,628 | Fegely et al. | Aug. 18, 1959 |
| 2,986,661 | Hasley | May 30, 1961 |